United States Patent [19]

Schmitt

[11] 4,044,854

[45] Aug. 30, 1977

[54] POWER STEERING SYSTEM FOR HEAVY LOAD DOLLIES

[75] Inventor: Marvin G. Schmitt, Fountain Valley, Calif.

[73] Assignee: AMI Industries, Inc., Downey, Calif.

[21] Appl. No.: 686,492

[22] Filed: May 14, 1976

[51] Int. Cl.² ............................................. B62D 5/06
[52] U.S. Cl. .................................. 180/140; 280/81.5
[58] Field of Search ............... 180/140, 144, 152, 153, 180/23, 24; 280/81.5, 442, 443

[56] References Cited

U.S. PATENT DOCUMENTS 2,761,693  9/1956  Stover ............................. 180/140 X
2,818,275  12/1957  Hollowell ....................... 280/81.5 X

*Primary Examiner*—Joseph F. Peters, Jr.
*Assistant Examiner*—John A. Pekar
*Attorney, Agent, or Firm*—McNenny, Pearne, Gordon, Gail, Dickinson & Schiller

[57] ABSTRACT

A multiple dolly system for transporting large loads in which individual dollies are simultaneously power-steered through a fluid linkage steering control. Castered wheels of the dollies are steered by fluid power actuators having appropriate ones of their working chambers connected in parallel circuit arrangements, wherein ground reaction forces on the castered steerable wheels are equalized by the tendency of the parallel fluid circuits and actuator chambers to reach a balanced minimum pressure, and whereby the wheels, seeking a path of least resistance, are self-synchronizing in their steering displacements.

10 Claims, 6 Drawing Figures

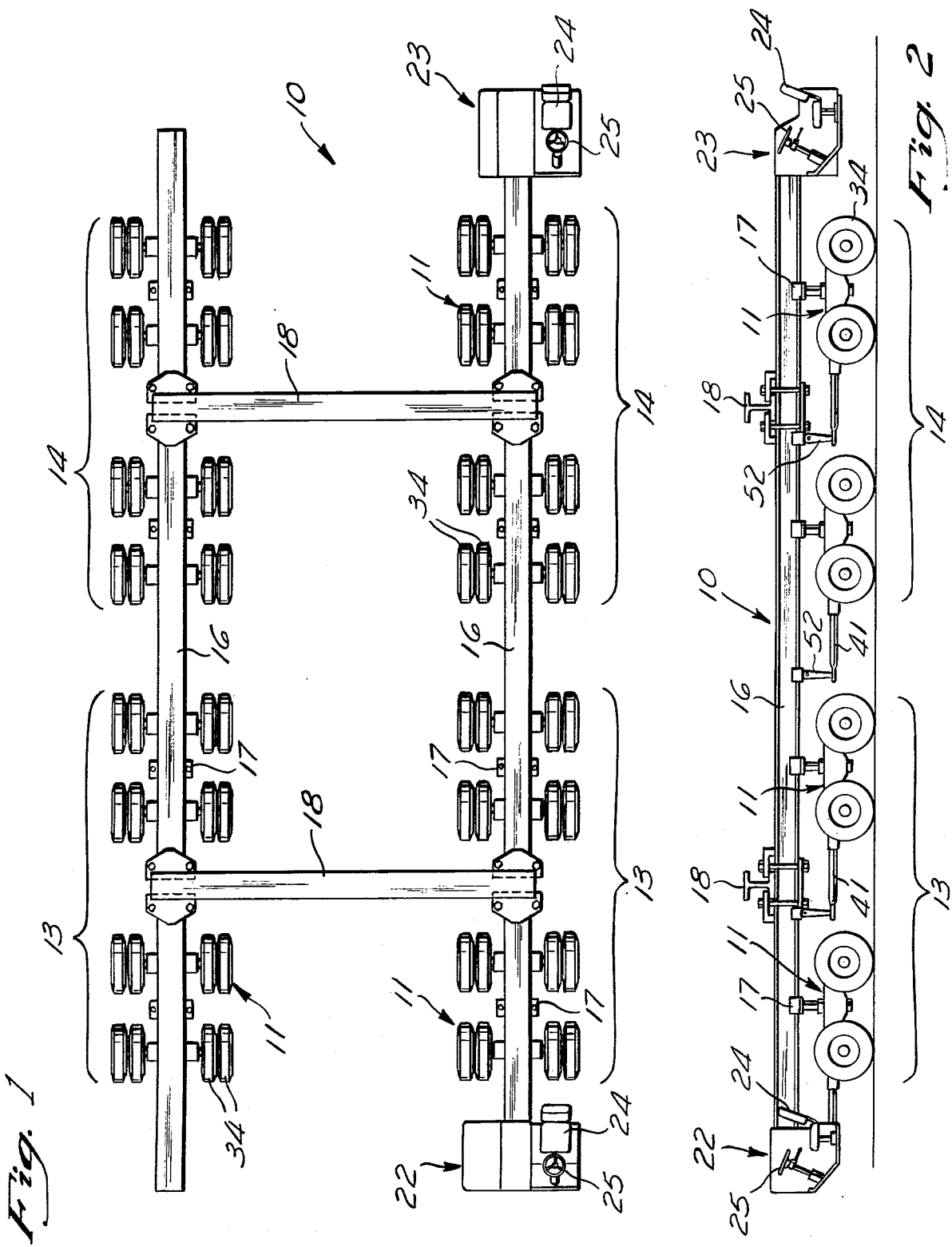

POWER STEERING SYSTEM FOR HEAVY LOAD DOLLIES

BACKGROUND OF THE INVENTION

The present invention relates to multipurpose load carrying dollies and, more specifically, to a system for power steering a plurality of such dollies.

PRIOR ART

Wheeled frames, known as dollies, have long been used in multiples to transport heavy or bulky loads such as buildings, large machinery, mechanical equipment, etc., both on and off roads. In the past, such dollies have usually been limited in their steering capacity, often with no self-carried steering provisions whatsoever and usually without means of synchronizing the steering of individual dollies.

Specialized load transport systems have been previously proposed which provide interconnected steering assemblies for a plurality of steerable wheels situated along the length of the carriage system. Such load transport systems include steerable road trailers and road trains. Ordinarily in systems of this type, the relative spacing between the wheel sets is necessarily fixed by a particular rigid frame configuration. Further, the steering of multiple sets of wheels in these systems is generally accomplished with mechanical linkages. As a result, such systems customarily must be designed for a single use, e.g., hauling timber or other raw materials. Besides the limitations on the size or weight of a load imposed by the frame capacity of typical predesigned units used in these older systems, other constraints on the load capacity are imposed by the mechanical steering linkages which, in practice, are limited by space and geometry considerations, as well as by physical interference with necessary frame elements.

SUMMARY OF THE INVENTION

The invention provides a power steering system for simultaneously controlling a plurality of separately steerable dollies which, by utilization of fluid linkage in the steering system, permits the dollies to be arranged relative to one another in a suitable array selected for a particular application. The fluid linkage system provides practically unlimited design freedom in placement of sets of dollies for both one-time use in a specific application followed by disassembly and eventual rearrangement for subsequent wholly different applications, as well as continued use in a single long-term application.

In accordance with an important aspect of the invention, the steerable wheel or wheels of the separate dollies are castered and are steered by fluid-driven acutators controlled through branch circuits connected in parallel. Ground reaction forces operating on the castered wheels cause these wheels to assume a path of least resistance, which coincides with an ideal steering angle for each wheel for a desired steering angle of the system. Synchronized movement of all the wheels results through equalization of fluid pressure in the commonly connected working chambers of the steering actuators.

A primary advantage of the combined castered wheels and fluid-linked actuators is simplification over prior systems by avoidance of complex mechanical linkages, electrical and/or fluid position indicating feedback signals and attendant sensors, transducers, transmitting lines, and other hardware for synchronizing separate steerable wheels.

The invention offers many additional advantages over prior dolly-based carriage of heavy or bulky loads. As disclosed in the preferred embodiment, individual dollies may be provided with a suspension system, allowing them to roll, pitch, and more vertically relative to the load and other dollies. Such freedom of movement is readily accommodated where, as disclosed, the steering actuators are fluid-linked by flexible hose or the like. Fluid-conducting, steering control lines are readily made up, routed, and connected to each dolly, thereby making it practical to design an array of dollies to suit a particular load configuration without undue concern for the steering control elements. Steerable dollies, moreover, are readily added to or removed from an original plan in the field as needed, owing to the ease of hookup in the fluid circuitry and the self-adaptive nature of each new dolly arrangement, wherein ground steering reaction loads are automatically redistributed within the new system. Further, the disclosed fluid-linked steering system is operative with a multiplicity of tandem, abreast, or combinations of tandem and abreast steerable dollies, as disclosed, so that a particular load may be supported at advantageous points governed by the geometry of the load or the load-supporting medium.

BRIEF DESCRIPTION OF THE DRAWINGS

FIG. 1 is a plan view of a typical multiple dolly carriage assembly for transporting heavy loads;

FIG. 2 is a side elevational view of the multiple dolly carriage assembly of FIG. 1;

DESCRIPTION OF THE PREFERRED EMBODIMENT

Figure 3:
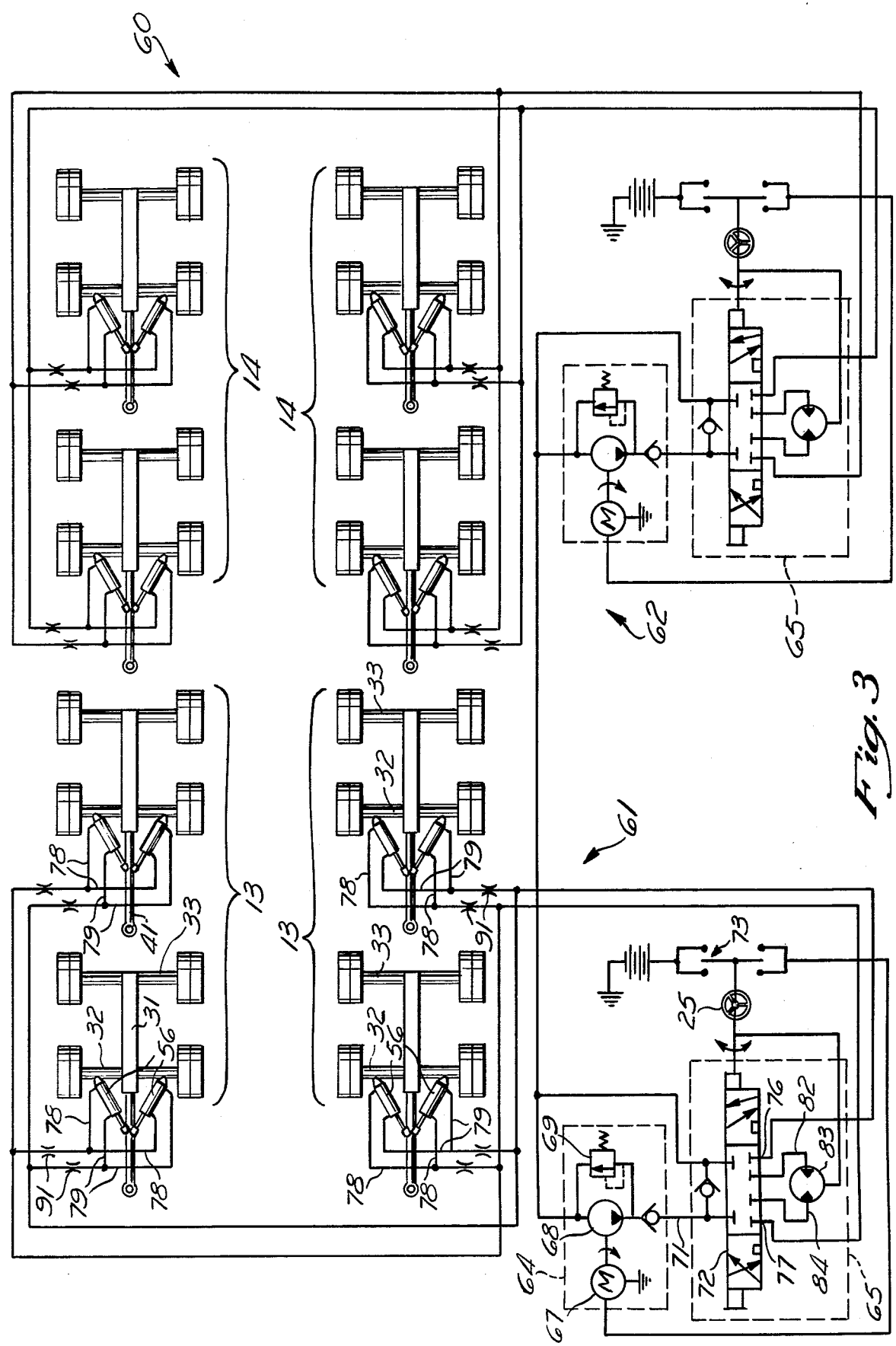
FIG. 3 is a schematic drawing of a fluid power steering control circuit for the assembly of FIGS. 1 and 2.

Referring particularly to FIGS. 1 and 2, a carriage system 10 comprises a plurality of substantially identical load supporting dollies 11. The dollies 11 are arranged in separately steerable fore and aft groups 13 and 14, which, as illustrated, are provided in equal numbers, although the principles of the invention are not limited to such equality or symmetry.

The dollies 11 are connected to a pair of load supporting beams 16 by coupling means 17, to be described. The dollies 11, collectively forming an array of load supporting points, are suitably disposed over a horizontal or ground plane to assure that a given load is adequately supported and that, generally, the center of gravity of the load lies over this array, preferably at or adjacent the geometric center of the latter. The beam 16 lie longitudinally in the principal direction of movement, with the dollies 11 associated with each of them arranged in tandem and the dollies of opposite beams arranged abreast to one another. The longitudinal beams 16 are rigidly cross-tied by a pair of suitable I-beams 18 clamped or otherwise fixed to the beams.

As will be appreciated, various types and configurations of loads may be supported on the beams 16 or their equivalents. Additional support elements may, of course, be added to the beams 17, 18 to form, for example, platforms and/or trusses complementary to the shape of the load to be carried. Loads to be transported by the disclosed carriage assembly 10 and similar carriage arrangements, depending principally on the number of dollies provided, may range, for example, between 90 and 800 tons. At suitable locations on the carriage assembly 10 are stations 22, 23, for accommodating human operators. As shown, a station 22,23 includes an operator seat 24 and a steering wheel 25.

Figure 4:
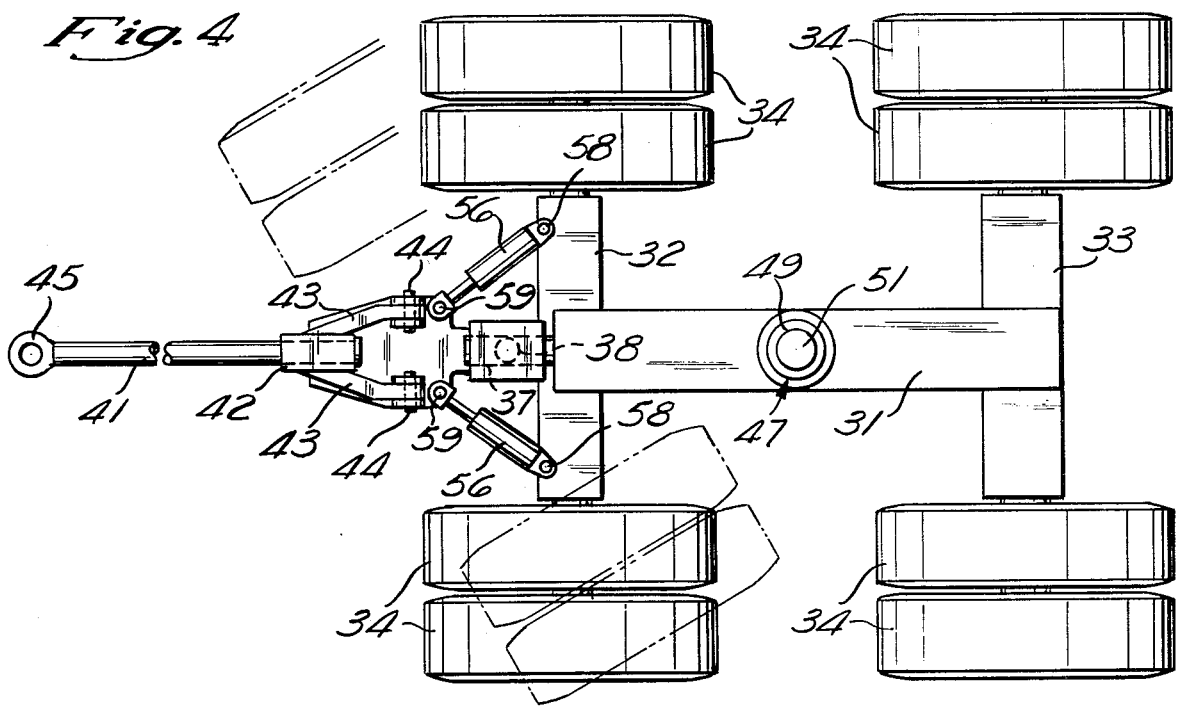
FIG. 4 is a plan view of an individual dolly on an enlarged scale illustrating structural detalis of the dolly.
Figure 5:
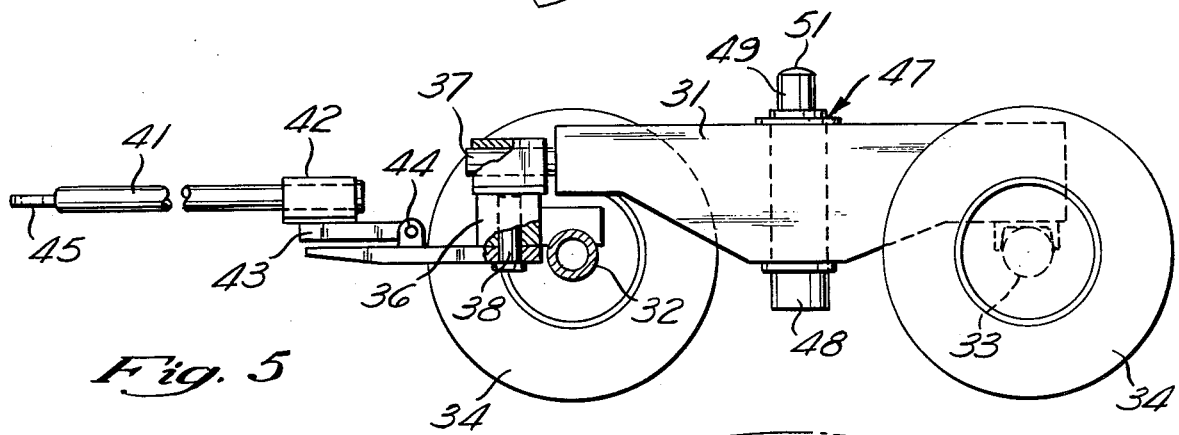
FIG. 5 is a side elevational view of the dolly of FIG. 4.

An individual dolly 11 is shown in FIGS. 4 and 5. A dolly 11 includes a longitudinal beam 31 supported at one end by a front steerable axle 32 and at the opposite end by a transverse rear fixed axle 33. Dual wheels 34 are provided at the outboard ends of each of the axles 32 and 33. The front axle 32 is adapted to roll with a pivotal carrier block 36 relative to the beam 31 on a stub 37 having a horizontal axis.

The front axle 32 is steerable and castered about a generally vertical pin 38 on the carrier block 36. A draw bar 41 is telescopically mounted in a block 42 which, in turn, is rigidly fixed to a pair of forwardly extending arms 43 connected to the axle 32. The arms 43 are pivotal relative to the axle about a horizontal axis on laterally spaced pins 44, permitting vertical movement of a forward end 45 of the drawbar 41.

A fluid-operated jack 47 is rigidly mounted within the beam 31 between the axles 32 and 33. The jack 47, preferably hydraulically operated, includes a vertical cylinder 48 and a piston or ram 49. The exposed end of the piston 49 is spherically shaped at 51. The fluid circuits of the several jacks 47 may be connected in parallel to a common manifold to equalize the load on each dolly 11 and permit the jacks to simultaneously raise or lower a load. The dollies 11 are horizontally fixed relative to the support beams 16 by the coupling means 17, which comprise a spherical socket (not shown) complementary to the spherical piston end 51. The sockets or coupling means 17 are suitably clamped or otherwise fixed to the beams 15 at desired locations. Similarly, the free ends 45 of the drawbars 41 are fixed relative to the beams 16 by depending brackets 52 clamped or otherwise fixed to the beams at appropriate points.

A pair of double-acting piston and cylinder fluid actuators 56 of substantially identical construction are symmetrically mounted in a horizontal plane on opposite sides of the drawbar 41. Actuator cylinder ends 58 are pivotally fixed to the steerable axle 32 at spaced points, while actuator rod ends 57 are similarly connected to the drawbar block 42. Desirably, the actuators 56 are universally mounted, or mounted with sufficient free play at either end, to permit the cylinders to swing in a vertical plane with the drawbar 41.

Referring to FIG. 3, a steering control system 60 constructed in accordance with the present invention is shown. In the illustrated embodiment, the fore and aft dolly groups 13 and 14 are each provided with separate control circuits 61, 62, respectively, of generally the same construction. The circuit 61 associated with the front group 13 of dollies will be discussed in detail. The actuators 56 are connected in parallel circuit branches to a source of pressurized fluid, outlined in phantom at 64, through a directional steering control system, outlined in phantom at 65. In the preferred embodiment, hydraulic fluid is used in the control system 60, although use of other fluids, such as air, is conceivable.

The source of pressure 64 includes an electric motor 67 and associated pump 68. A release valve 69 is connected to the outlet of the pump 68. The pump outlet is connected to the directional control 65 by a line 71. The steering control 65 may be a commercially available unit, such as marketed by Char-lynn Company, of Eden Prairie, Minnesota, under the registered trademark ORBITROL.

A spool 72 of the steering control 65 directs pressurized fluid at the supply line 71 in a volume proportional to the angular displacement or number of turns through which the steering wheel 25 is turned to appropriate chambers of the actuators 56. Turning of the steering wheel 25 to the left or right causes a switch 73 to close and activate the motor 67, and thereby operate the pump 68 on demand.

The steering control 65 has two external ports, indicated at 76 and 77, one of which, during steering operation, either supplies or vents pressurized fluid to or from working chambers of the actuators 56, while the other, at the same time, performs the opposite function. More specifically, a first valve port 76 is connected by parallel circuit branches 78 to appropriate chambers of each actuator 56, and a second port 77 is connected by parallel circuit branches 79 to the remaining actuator chambers, i.e., the chambers on opposite sides of the actuator pistons from the piston sides to which the first port 76 is connected. Suitable portions of the branches 78 and 79 are of flexible, hydraulic pressure hose or the like, to permit freedom of movement of the dollies 11.

To effect steering movement of the dollies 11, for example to the left, the steering wheel 25 is rotated to displace the spool 72 from its illustrated, closed center position to the right as viewed in FIG. 3. Pressurized fluid from the line 71 and through the spool 72 enters an internal control passage 82, passes through a servo element 83, and another internal control passage 84, across the spool and ultimately out of the control port 76 to the actuators 56. In FIG. 3, the port 76 is connected to the piston end chambers of those actuators on the left side of the dollies, and the rod end chambers on those actuators on the right side of the dollies. Simultaneously, the remaining or opposed actuator chambers are vented through the control port 77, as revealed by inspection of the diagram. Introduction and exhaust of fluid to the particular ones of the actuator chambers just discussed cause angular steering displacement of the steering axles 32 to the left from the illustrated straight-line condition shown in FIG. 3.

Study of the circuit 61 reveals that right-hand turning of the axles 32 is accomplished by moving the spool 72 to the left. Operation of the rear control circuit 62 and the associated steering axles is analogous to that just described. For the purpose of the present disclosure, it is presumed that the carriage assembly is propelled by a separate tractor or other device or devices. Such a device (not shown) is normally connected to pull or push the carriage assembly 10 from either of its ends by coupling through suitable means with one or both of the beams 16.

Power steering of the carriage assembly 10, by the control circuit 60, is effected when the carriage is moved forwardly, i.e., in the general direction in which the drawbars 41 are pointed, and to the left in the various figures. In this leftward direction, the steerable wheels on the axles 32 are castered behind their associated pins 38. The forward steering wheel 25 is turned to eventually cause the forward dolly group 13 to assume a configuration corresponding to that of FIG. 6, i.e., with the forwardmost sets of dollies 11 taking a greater degree of steering bias than succeeding ones such that each axle points to a common center of turning 86. Inspection of FIG. 6 reveals that for a proper left turn, the dollies of the rear group 14 are properly aligned by steering the associated axles to a rightward steering angle.

Figure 6:
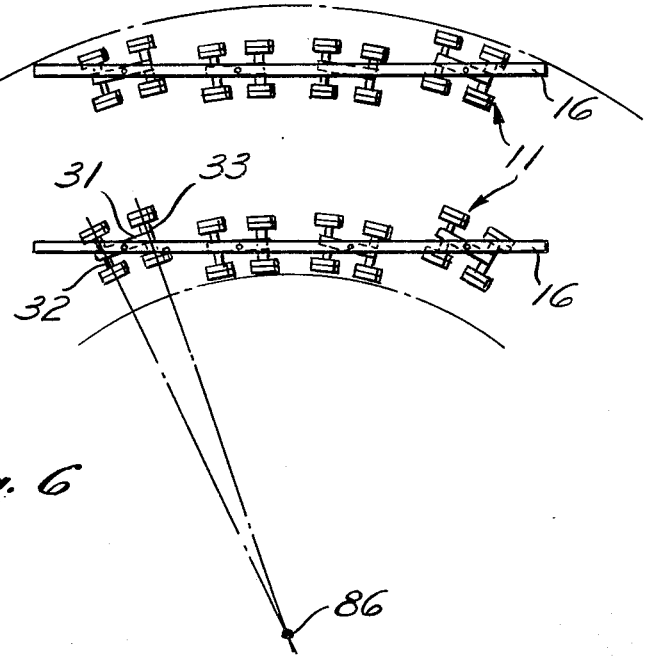
FIG. 6 is a schematic illustration of the multiple dolly carriage assembly in a turning condition under a power steering control.

In accordance with an important feature of the invention, it has been found that the wheels of the dollies, with the steerable wheels suitably castered and appropriate actuator chambers connected in parallel circuits as shown, will assume a path of least resistance in a steering mode such that they each seek the respective positions indicated in FIG. 6. That is, the wheels seek a rolling path and tend to avoid sidewise scrubbing or slipping. Thus, the wheels, in an effort to stabilize or avoid unbalanced lateral ground reaction loads, are self-synchronizing in their movement.

With reference to FIG. 6, the connection between a dolly jack 47 and its associated bracket 17 permits pivotal movement of the dolly beam in a horizontal plane by rotation of the piston 49 in the cylinder 48, or in the bracket 17, thereby allowing the rear or trailing wheels to caster with their axle 33 and assume a path of least resistance similar to the action of the wheels on the front axle 32.

The desired total steering angle is achieved or measured by the volume of fluid metered out of the control 65 in direct proportion to the number of turns of its associated steering wheel 25. This volume is displaced unequally between the actuators 56 of the forwardmost dollies 11 and succeeding dollies in the fore group 13 and, likewise, the rearwardmost and preceding dollies in the aft group 14, to account for the above-mentioned differences in their respective steering angles or bias (FIG. 6). This unequal distribution of a given fluid displacement volume is achieved by the control system 60 itself. This advantageous result is due to the parallel circuit arrangement of lines connecting appropriate actuator chambers, as shown, and the requirement by nature that in a static condition pressures must be equalized in these chambers. Thus, a castered steering axle 32 will be moved into an equilibrium condition by the tendency for the pressure in the related circuits to minimize itself and ground reaction loads on the castered axle tending to minimize the steering angle.

The illustrated steering control systems 65 are of the tandem center valving type, with the actuator ports 76 and 77 blocked in neutral such that once movement of the steering wheel has ended and a corresponding volume of fluid is metered to the actuators, the fluid volume remains locked in the circuitry and actuators, maintaining a constant angle of steering until the steering wheel is again turned. Individual fluid flow restrictors 91 are connected in series in lines leading to the circuit branches 78, to restrict fluid flow and thereby dampen sudden turning of the steering axles 32, reflected by displacement of fluid in the actuators 56, due to lateral ground forces developed when a wheel strikes an object.

When desired, for example in tight maneuvering quarters, the drawbars 41 may be disconnected from the brackets 52 and the branch lines 78 and 79 disconnected from the actuators 56 if necessary to permit the dollies 11 greater freedom of movement to achieve a smaller turning radius. The dollies 11, with the drawbars 41 disconnected, may be allowed to seek a steering angle or centers of steering on their own by castering, or may be forced into a particular configuration manually or with a tractor or other power device. It is contemplated that in some instances, particularly where the carriage assembly 10 is relatively long and substantially more dollies are used than the number shown, leading and trailing dollies may be allowed to freely caster without attachment of their associated drawbars to allow them to achieve a high steering angle relative to the beams 16, while intermediate dollies are connected with their drawbars, as described above, to achieve a minimum turning radius despite overall length of the carriage assembly. It is also contemplated that other steering actuator arrangements may be employed, including suitable rotary fluid power actuators, for example. Although each steerable axle 32 is illustrated as equipped with pairs of double-acting cylinders or actuators 56 for geometric and hydraulic symmetry, it has been found that a single double-acting piston cylinder actuator on each steerable axle provides a satisfactory system. The number of wheels on a dolly is a matter of design choice, and the number of steerable wheels controlled by an actuator may be reduced to only one.

Although preferred embodiments of this invention are illustrated, it is to be understood that various modifications and rearrangements of parts may be resorted to without departing from the scope of the invention disclosed and claimed herein.

What is claimed is:

1. A system for transporting a load of high mass and/or bulk comprising a plurality of steerable wheeled dollies, means for locating each of the dollies relative to one another and to the load, each steerable dolly having at least one castered wheel, a source of pressurized fluid, a fluid power actuator associated with each steerable dolly, the power actuator of each steerable dolly being operably connected to its associated castered wheel to forcibly steer the wheel angularly to the left or right in response to changes in fluid volume in the actuator, control means for directing fluid from the source to the actuators and for exhausting fluid pressure from the actuators to thereby operate the actuators and determine the steering position of the castered wheels, at least two of said actuators being coupled by a common fluid pressure in a parallel branch circuit fluid connection to said control means whereby steering reaction forces on the associated wheels are employed to synchronize the angular steering displacement of the associated wheels by balancing of the common fluid pressure in the coupled actuators.

2. A system as set forth in claim 1, wherein hydraulic fluid is provided by said source, and flow restriction means are provided in series with said circuit branches to damp instantaneous movement of said castered steerable wheels by resisting high fluid flow rates in said branch circuits caused by suddent changes in the position of said actuators with movement of said steerable wheels.

3. A system as set forth in claim 1, wherein said actuators are of the double-acting, two-chamber type, said control means being arranged with respect to each actuator in one mode to pressurize one chamber and exhaust the other, and in the other mode to exhaust said one chamber and pressurize said other chamber.

4. A system as set forth in claim 1, wherein said dollies are arranged in tandem.

5. A system as set forth in claim 1, wherein said dollies are arranged abreast of each other.

6. A system as set forth in claim 1, wherein said dollies are arranged both in tandem and abreast of one another.

7. A system as set forth in claim 6, wherein the castered wheel of a dolly is the lead wheel of a tandem wheel set of the dolly.

8. In combination, at least two load-supporting dollies, each dolly having at least one wheel castered and steerable about a related, generally vertical axis, the steerable wheel or wheels of each dolly being free of direct mechanical linkage to the wheel or wheels of the other dolly or dollies, a separate fluid power actuator associated with the steerable wheel or wheels of each dolly, each actuator having two opposing chambers, each of the actuators being arranged such that one chamber is adapted to be pressurized to a higher pressure than that of the other for causing a turn of the associated wheels or wheels in rotation in one common direction about the generally vertical related axis and the other chamber is adapted to be pressurized at a higher pressure than that of the one for causing an opposite turn of the associated wheel or wheels in rotation in an opposite common direction about the generally vertical related axis, the one chamber of each actuator being commonly connected to each other by parallel branch circuits and being isolated from the other chamber, the other chamber of each actuator being commonly connected to each other by parallel branch circuits and being isolated from the one chamber, whereby the steerable castered wheel or wheels of each dolly are fluid-linked to each other and are self-synchronizing in their steering operation upon forward movement and castering of said wheels.

9. A carriage assembly for transporting heavy and/or bulky loads, comprising a plurality of dollies independently supporting a load-carrying medium, the dollies each having a beam, a forward steerable wheel castered on the forward end of the beam, a rearward wheel on an axle at the rearward end of the beam, each dolly being attached to the load-carrying medium by means permitting the beam to turn about a vertical axis adjacent its longitudinal center, a separate, two-chamber, bidirectional power fluid actuator associated with each dolly and operably connected to the steerable wheel of the dolly to selectively cause it to turn to the left or right in response to an increase in fluid pressure in one of the chambers relative to the other, or vice versa, each actuator being fixed to an element located with respect to said carrier medium and free of direct rotation with its associated dolly beam, the chambers of said actuators being operable to produce a right turn being commonly connected by parallel branch circuits and the chambers of said actuators operable to produce a left turn being commonly connected by parallel branch circuits separate from the first-mentioned branch circuits, and control means for selectively varying the volume of fluid in said right-hand turn chambers relative to the volume in said left turn chambers to effect turning movement of said wheels.

10. A carriage assembly as set forth in claim 9, wherein said dollies are arranged in fore and aft groups relative to the principal direction of movement, said control means having means for turning the steerable wheels of the first group in one direction and means for turning the steerable wheels of the second group in the other direction.

* * * * *